United States Patent
Burmester et al.

(10) Patent No.: US 8,336,572 B2
(45) Date of Patent: Dec. 25, 2012

(54) DOUBLE SEAT VALVE WITH SEAT CLEANING

(75) Inventors: Jens Burmester, Grambek (DE); Matthias Suedel, Ratekau (DE)

(73) Assignee: GEA Tuchenhagen GmbH, Buchen (DE)

( * ) Notice: Subject to any disclaimer, the term of this patent is extended or adjusted under 35 U.S.C. 154(b) by 508 days.

(21) Appl. No.: 12/664,354

(22) PCT Filed: Jun. 6, 2008

(86) PCT No.: PCT/EP2008/004535
§ 371 (c)(1), (2), (4) Date: Dec. 11, 2009

(87) PCT Pub. No.: WO2008/151763
PCT Pub. Date: Dec. 18, 2008

(65) Prior Publication Data
US 2010/0180958 A1 Jul. 22, 2010

(30) Foreign Application Priority Data
Jun. 14, 2007 (DE) .......................... 10 2007 027 464

(51) Int. Cl.
*F16K 1/44* (2006.01)
(52) U.S. Cl. ..................... 137/240; 137/312; 137/614.18
(58) Field of Classification Search .................. 137/238, 137/240, 312, 614.18, 614.19
See application file for complete search history.

(56) References Cited

U.S. PATENT DOCUMENTS

| 4,687,015 A | 8/1987 | Mieth |
| 5,806,554 A | 9/1998 | Mieth |
| 6,230,736 B1 * | 5/2001 | Scheible et al. .............. 137/240 |
| 6,676,047 B1 * | 1/2004 | Lindholm et al. ............ 137/240 |
| 2011/0309285 A1 * | 12/2011 | Sauer ............................ 251/359 |

FOREIGN PATENT DOCUMENTS

| DE | 3835944 A1 | 4/1990 |
| DE | 19608792 A1 | 9/1997 |
| EP | 0174384 A1 | 3/1986 |
| WO | 2007/054131 A1 | 5/2007 |

OTHER PUBLICATIONS

Operating Instructions BAA D620-PMO.32, Double Seat Valve Type D 620 PMO (Referenced in the Specification of the Application., Jun. 30, 1999.

* cited by examiner

*Primary Examiner* — Kevin Lee
(74) *Attorney, Agent, or Firm* — Vidas, Arrett & Steinkraus P.A.

(57) ABSTRACT

The invention relates to a double seat valve which is capable of cleaning the seat. The double seat valve includes a closing element (4), when in its closed position rests with a stop surface (4e), arranged on a boundary surface thereof radially adjacent on an inner side to a seal (7), on a second seating surface (2b) and directly adjacent to a first seating surface (2a, 2g) with a central recess (4d) provided in a front face of the closing element (4) facing a leakage cavity (5). The closing element (4) further includes a deflector surface (4b) opening in a front face (4c), wherein the deflector surface (4b) and the slop surface (4e) form a circumferential edge (U2) directly adjacent to a first end section (2g) of the first seating surface (2a) in the closed position of the closing element (4).

31 Claims, 7 Drawing Sheets

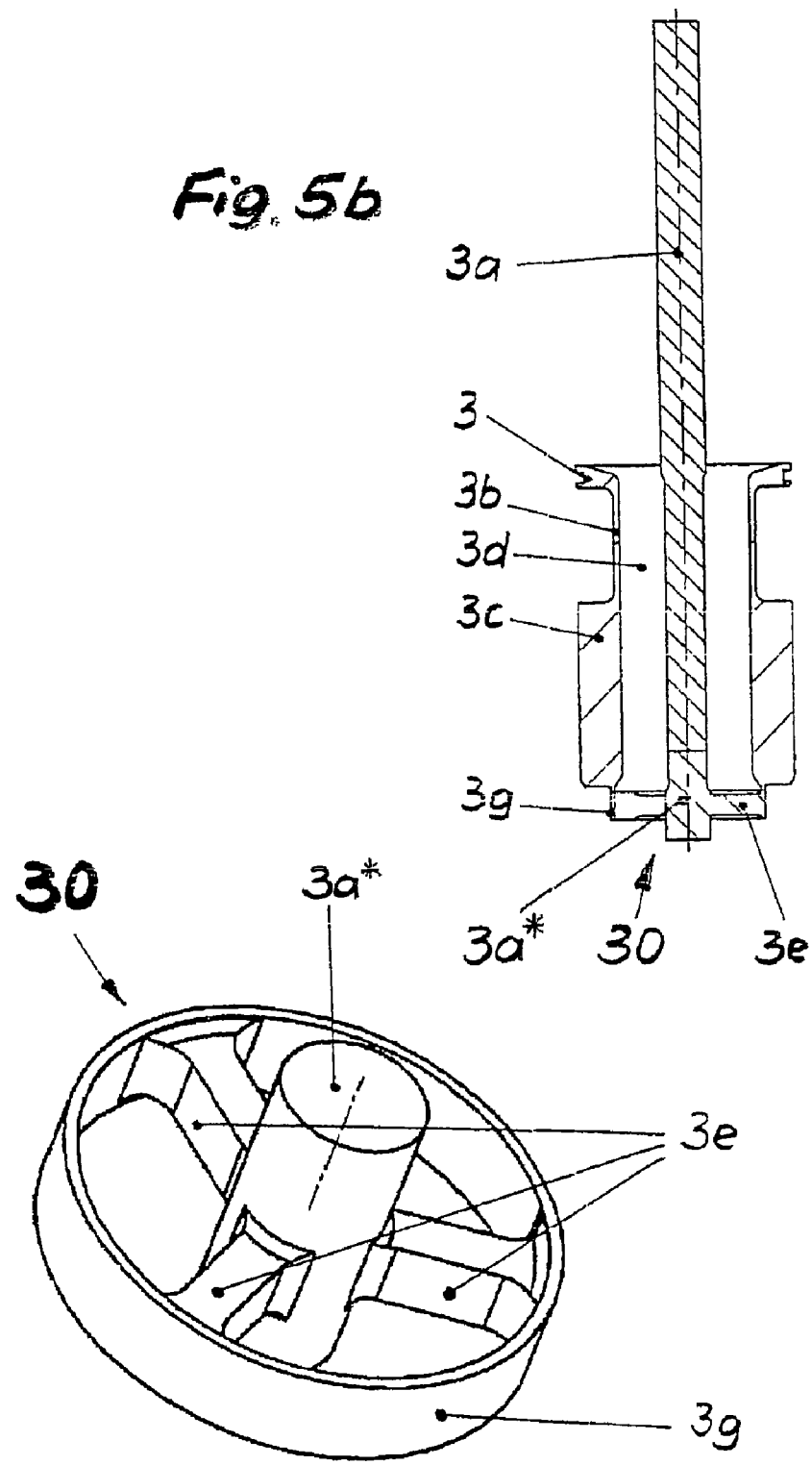

DOUBLE SEAT VALVE WITH SEAT CLEANING

CROSS-REFERENCE TO RELATED APPLICATIONS

Not applicable

STATEMENT REGARDING FEDERALLY SPONSORED RESEARCH

Not applicable

BACKGROUND OF THE INVENTION

The invention relates to a double seat valve with seat cleaning, having two serially arranged closing elements, movable relative to each other, that in the closed position of the double seat valve prevent the overflow of fluids from one valve housing part into another, and that in the closed as well as the open position define a leakage cavity, that is connected to the surroundings of the double seat valve, wherein in the closed position, the first closing element constructed as a slide piston is received in a sealing manner in the connecting opening joining the valve housing parts together, and in the course of its opening movement comes into sealing abutment with a second closing element that is assigned to a second seat and has a second seal, via a center seal acting between the closing elements, and the latter during the further opening movement is led also into an open position, wherein the first closing element has a first seal that seals radially against a cylindrical first seat formed in the connecting opening, with closing elements that can be moved gap-wide independently from each other by a partial lift, in each case, into a seat cleaning position for the purpose of flushing their coaxial seat, wherein the second closing element is moved by a second partial lift in the same direction as the opening movement, and the first closing element is moved by a first partial lift in the direction opposite to the opening movement into its respective seat cleaning position. A double seat valve with seat cleaning of the initially described type that according to Claim 1, permits a cleaning of the respectively uncovered seat through a gap wide opening of its seats is known from the German patent DE 38 35 944 C2. Each of the three seals in the known double seat valve is a discrete seal, wherein each seal performs a single function. The first seal in the first closing element is a purely radial acting seal, which slides into the first seat formed as a cylindrical circumferential area, and seals there are as a consequence of the provided pre-loading (seal with slide engagement). The second seal in the second closing element acts on the second seat, formed cone shaped, so that this can be called radially/axially acting seal (seal with pressure engagement). As a rule, if a seal with pressure engagement is intended, a fixed stop for limiting the end position of the second closing element (closed position) is located at the second seat. The third seal, the so-called center seal, exhibits its effect when during the opening lift, the first closing element comes into abutment with the second closing element via this center seal, and in the course of further opening movement, takes the second closing element along into the completely open position (seal and pressure engagement). Here, the center seal is arranged in a front face facing the leakage cavity, at the second dependently driven closing element.

The known double seat valve, briefly outlined above, has two so-called seat cleaning positions, where the first seat cleaning position is created by the first partial lift of the first closing element in a direction opposite to the opening lift. In the seat cleaning position of the first closing element (this is the lower closing element in reference to the drawing position according to FIG. 3) simultaneously, also a bushing of a drain pipe through the lower valve housing, formed as pressure compensation piston and connected to the first closing element, is uncovered for the purpose of cleaning the assigned seal. The seat cleaning position of the second (upper) closing element is not discussed further in the German patent DE 38 35 944 C2; it occurs through the second partial lift in the same direction as the opening lift. The limitation of the respective quantity of cleaning agent during the seat cleaning occurs through a more or less elaborate, and often insufficient, alignment of the opened gap between the respective seal in the associated seat.

The requirements placed in certain countries on such double seat valves with seat cleaning go beyond the mentioned limitation and are more comprehensive. Thus, for example, in the USA it is required that in the course of the seat cleaning of the other closing element, in the case of larger seal defects or even in the case of the failure of one of the two seat seals of the closing element which is in the closed position, no cleaning agent may pass through via the respective seal defect or via the seat region without seat seal. Under these conditions, not only the requirement to limit the quantity of cleaning agent and avoid a direct impact on the seat region in the course of the seat cleaning, is placed on such a double seat valve, but also the requirement of a possible turbulence free removal of the seat cleaning flow initially into the leakage cavity, and from there into the surroundings, without this seat cleaning flow flowing directly against the respectively closed seat region or impacting it with increasing pressure.

A double seat valve that during the seat cleaning, limits itself solely on the uncovering of the seat in the region of the respectively assigned closing element, and that furthermore realizes a connection of the leakage cavity to the surroundings of the double seat valve, wherein the passage cross-section area of the connection nearly corresponds to the passage cross-section area of the largest nominal pipe size connected to the double seat valve, is described in the company literature "Operating Instructions BAA D620-PMO.32, Double Seat Valve Type D 620 PMO" from Südmo Components GmbH, 73469 Riesbürg, Germany. This double seat valve, due to its ample dimensioning of the connection line between the leakage cavity and the surroundings, is fundamentally suited to prevent a pressure build up in the leakage cavity in the case of larger seal defects. The requirement for avoiding a direct impact on the seat in the course of the seat cleaning, and also of a possibly turbulence free removal of the seat cleaning flow, first into the leakage cavity, and from there into the surroundings, cannot be attained in the known double seat valve. Direct impact is understood to be every speed component of the respective seat cleaning flow, directed orthogonally onto the walls delimiting the seat. It has been shown that any such direct impact leads to a conversion of the kinetic flow energy into static pressure. Depending on the angle of impact of the flow against the wall or body surface, a branching of the flow results in a so-called "branching flow line", wherein the latter divides the flow into two halves. The branching flow line itself runs up against the so-called "stagnation point", such that the speed at this location is zero. The pressure increase as a result of this stoppage of the speed is also called "dynamic pressure". The mechanisms increasing the pressure, described above, generate a leakage flow across the respective gap between the closing element in the assigned seat, and the seat seal that is defective or no longer present at all.

Therefore, a direct impact of the seat cleaning flow on the surface delimiting the leakage cavity is always counterproductive. In the two known double seat valves described above, the first seat cleaning flow which is generated by opening the first closing element by the first partial lift, can impact more or less perpendicularly on the front side periphery of the second closing element, which carries along the center seal. At the point of impact this flow is predominantly redirected to the center of the leakage cavity, and the flow touches, among others, also the front face of the protecting center seal. Furthermore, at the impact point, a branching current line results whose branch facing the seat can generate turbulence there, and a dynamic pressure. The second seat cleaning flow, which is generated by opening a second closing element by a second partial lift, impacts on the front side periphery of the first closing element, and here too, a part of the flow between the branching current line and the seat can be carried to the latter, developing dynamic pressure.

In the patent WO 2007/054 131 A1, measures are already proposed which guarantee drainage, as turbulence free as possible, of the seat cleaning flow into and out of the leakage cavity, and avoid a pressure increasing direct impact on the seat. However, these measures relate to a double seat valve with the features of the German patent DE 196 08 792 A1. The double seat valve described there is distinguished, in particular, in that on the leakage cavity side, each closing element has a known cylindrical appendage on it, which with an associated connection hole between the valve housing parts forms a ring shaped choke gap, and in that a first section of the connecting hole associated with the smaller closing element has a diameter that is smaller than the diameter of a second section of the connecting hole associated with the other closing element, and in that a transition surface is provided between the two sections which forms an obtuse, preferably a perpendicular, deflection angle with the larger diameter section.

It is the object of the present invention to further develop a double seat valve of the initially described type that insures drainage of the seat cleaning flow that is as turbulence free as possible into and out of the leakage cavity, and that reliably avoids a pressure increasing direct impact on the seat.

BRIEF SUMMARY OF THE INVENTION

The object is solved by a double seat valve with the features of Claim 1. Advantageous designs of the double seat valve with seat cleaning according to the invention are described in the dependent claims.

The principle of the separate center seal, which has the task to seal the two closing elements against each other in the so-called pickup position while performing the further opening movement up to the open position, is maintained here in any case, where the solution according to the invention is by no means restricted to only one of the two arrangements proposed below with respect to the position of the center seal. In principle, the solution according to the invention permits the arrangement of the center seal either in the front face of the second closing element, or alternatively in the front face of the first closing element.

For the solution of the task that is the basis of the invention, a first fundamental inventive idea consists in directing the seat cleaning flow that is discharging during the seat cleaning, in each case, out of the associated gap between the seat seal and the seat into the leakage cavity, in the most turbulence free and unobstructed manner as possible, and draining it from there into the surroundings in the same manner. On the one hand, this succeeds due to a new flow contour guiding and diverting the seat cleaning flows in the leakage cavity. This new flow contour ensures during the seat cleaning of the lower lying first closing element that the first seat cleaning flow smoothly follows the shape of the wall in the region of the first seat. Afterwards, a smooth deflection of this first seat cleaning flow occurs in a central recess, which is provided in the front face of the second closing element facing towards the leakage cavity, so that the seat cleaning flow can reach into a central drainage hole arranged in the first closing element, without colliding with the first closing element in the region of its areas bordering the leakage cavity, or forming a dynamic pressure at the center seal. The central recess is formed essentially by a rotationally symmetric deflection surface, which begins radially outside at the front face in question of the second closing element, and on its front side is limited by a front face that is essentially perpendicular to the longitudinal axis of the second closing element, wherein the deflection surface opens in the front face.

The smooth deflection of the seat cleaning flow at the deflection surface is essential. This succeeds according to the invention in that, viewed in the meridian section, the deflection surface has a contour with an unbent shape, where under the conditions mentioned above, a directional vector at the outlet point of the deflection surface points to the drainage hole arranged centrally in the first closing element. Furthermore, it is essential that at the starting point of the contour a second circumferential edge is formed, which in the closed position of the second closing element immediately adjoins a first end section of the seat.

With the flow direction of the second seat cleaning flow generated by lifting the second closing element, it is essential that it breaks off in a defined manner at a first circumferential edge formed by the second seat and the first end section of the first seat, and is guided securely tangentially past the surfaces at the edge of the first closing element in the area of the leakage cavity. For this purpose, a safety offset between the first circumferential edge and the relevant areas of the first closing element is provided that prevents such an impact under all possible manufacturing conditions. A second fundamental inventive thought consists in moving the limit of the final position, the firm stop that is desirable but that is not or cannot be implemented in all cases (slider piston with radially effective seal in slide engagement or possibly seat plate with radially/axially seal in slide/pressure engagement) into its closing position at the end of the second seat, in fact immediately next to the first seat. According to the invention, this succeeds in that the second closing element in its closing position rigidly and firmly contacts the second seat in the position specified in the preceding, with a stop surface that is arranged at its periphery that is located radially inside next to its second seal. This measure removes the gap between the second closing element and the valve housing, adjacent to the leakage cavity, that was previously present, where the seal is usually made of metal. Now, in the course of cleaning the seat of the first closing element, no cleaning agent can reach the second seat seal that is defective or possibly missing entirely, through the metallically closed gap between the second closing element and the second seat.

Such a defined closure of this critical gap has not been provided previously with the known double seat valves of the type described in the beginning. It is essential for the realization of the second inventive thought that the respective stop surfaces at the second closing element and at the valve housing touch each other immediately, over the full circumference and, to the degree possible with a fixed and metallic contact, close to the leakage cavity. The degrees of freedom in the design of the second closing element with respect to possible mechanisms of action of the seat seal are not limited by the specified stop surface. In principle, second seals that act radially, radially/axially, or purely axially, can be provided in this area.

According to a first proposal, the center seal is arranged in the front face of the second closing element, where in this case a location in the front face of the recess radially inside of the deflection surface can be considered. In this, it must be assured that first, the deflection function of the deflection surface predominantly formed by the recess is guaranteed for the first seat cleaning, and that the first seat cleaning flow in its further movement experiences no interference at the center seal such that vortices can form and detachment effects can occur in the leakage cavity leading to the formation of a local dynamic pressure. In this case, the first closing element provides a sealing surface for this center seal at an associated surface of its end section.

An additional proposal provides to arrange an alternative center seal in the front side boundary of the first closing element, facing the leakage cavity, where then, this alternative center seal interacts with the front face of the recess in the second closing element, in particular in the radial inside area of the deflection surface. However, other contact points are possible as well, wherein the deflection surface itself is not excluded.

In both placement variants of the center seal, the safety offset of the first closing element from the directional vector at the outlet location of the second seat into the end section of the first seat is dimensioned such that it is at least as large as the sum of all manufacturing tolerances of the components of the double seat valve which in the closing position of the first closing element determine its axial distance from the second seat. When the alternative center seal is arranged in the first closing element, this safety offset must be increased by an amount, by which it protrudes from the front side boundary of the first closing element facing the leakage cavity.

A further proposal provides that a directional vector at the starting point of the contour of the deflection surface aligns with the first end section of the first seat. This preferred embodiment assures an entry of the first seat cleaning flow into the deflection surface, and therefore into the recess in the second closing element, that is as impact free as possible. The previously mentioned condition must be observed for a cylindrical end section that aligns with the cylindrical first seat, as well as for an end section that expands conically (a so-called opening slope) which is also provided in the context of the invention. The end section that expands conically can have exclusively curved, or curved and straight contour elements.

The first opening slope proposed according to the invention facilitates the entry of the first seal into the cylindrical first seat, and thereby reduces the wear of this seal. Fluidically, however, this opening slope is rather disadvantageous, as it delays the first seat cleaning flow due to the enlargement of the flow cross-section, and thereby presents the danger of a detachment of the flow. In this context, it is proposed to represent the end section forming the first opening slope by at least one cone-shaped surface. In order to avoid that the first seat cleaning flow detaches at the contour of this cone-shaped surface, it is proposed to incline the first end section by a pitch that is implemented to be in the range between 0 and 15 degrees, preferably in the range between 5 and 15 degrees, and here in turn, preferably with 15 degrees.

In order to design the first opening slope more resistant against detachment, a further proposal provides that the first end section is formed by two cone shaped surfaces that transition into each other with a rounding radius, where a second cone shaped surface adjoining immediately the first seat is inclined by a second pitch against the first seat, and the other cone shaped surface is inclined by a first pitch against the first seat. Here, the first pitch is implemented in the range of 7.5 to 15 degrees, preferably at 15 degrees, and the second pitch is implemented in the range of 5 to 10 degrees, preferably with 7.5 degrees.

It has further proven to be advantageous with respect to avoiding the creation of any dynamic pressure if the first circumferential edge formed by the second seat and the first end section is round with as small as possible a second corner rounding. In the ideal case, a sharp edged implementation should be provided here, which, however, is not permissible due to manufacturing and practical reasons (endangering the first seal).

In order to avoid the creation of a dynamic pressure at the entry of the first seat cleaning flow into the deflection surface in the second closing element, a further proposal provides that the second circumferential edge formed by the stop surface and the deflection surface is rounded with a smallest possible corner rounding. A sharp edged transition in this area is not admissible due to manufacturing reasons and practical reasons, and a relatively large rounding radius is counterproductive and leads to an undesired creation of a dynamic pressure.

In order to avoid that after leaving the deflection surface, the first seat cleaning flow streams against the center seal or the front face of the recess, creating a dynamic pressure, it is further provided that the deflection surface undercuts the front face by an axial undercut distance. Thereby, the contour of the deflection surface in the area of its outlet point can be pitched by a deflection angle with respect to the front face of the recess such that the first seat cleaning flow is tangential to the center seal, is thereby slightly diverted in the direction of the second closing element, and can then follow the wall shape of the adjacent front face of the recess in order to clean it. It has been proven advantageous if the deflection angle is implemented in the range of 5 to 20 degrees, preferably with 15 degrees.

According to a further proposal a satisfactory flow result is achieved in that the contour is composed of a sequence of curved sections that at their respective transition points have a common tangent. A further embodiment provides that the contour consists of a single section with continuously changing curvatures. Finally, it is proposed that the contour is composed of a single section with constant curvature. In order to assure a correct and trouble-free drainage of the cleaning agent under all pressure and speed conditions, it is provided that the front side boundary of the first closing element facing the leakage cavity has on all sides a circumferential chamfer that slopes towards the drainage hole. This chamfer is expediently implemented as a cone shape surface which is pitched with respect to the base surface of the cone with an angle in the range of 10 to 20 degrees, preferably 15 degrees.

In order to avoid the creation of turbulence and dynamic pressure not only in the area of the previously described seats of the double seat valve, it is advantageous if any internal fittings or obstructions in the remaining leakage cavity are omitted if this is constructively possible. In this respect, a further proposal provides that a first displacement rod, connected to the first closing element, concentrically penetrates a second displacement rod implemented as a hollow rod, connected to the second closing element, continues flying through the drainage hole, and is rigidly connected to the first closing element at the latter's end facing away from the second closing element, via an essentially radially oriented traverse. This way, the struts and other means of connection that are otherwise customary in the area of the leakage cavity are avoided, and are relocated to a relatively distant end of the leakage cavity where they no longer can have any disturbing influences on the flow guidance.

In this context it is further proposed that three traverses are fixedly provided at a displacement rod section, said traverses are uniformly distributed over the circumference and that each is fixedly connected on its outside to a circumferential ring, and that the displacement rod section, the traverses, and the ring form an integral welded part. Here, it is further advantageous if the welded part connects on its outside via the ring to a pressure compensation piston that bounds a section of the drainage hole that is remote from the leakage cavity, and on its inside connects via the displacement rod section to the first displacement rod, and if the ring in its interior diameter is enlarged with respect to the diameter of the drainage hole, and with the intermediate arrangement of a conically expanding transition, such that the interior passage through the drainage hole is not reduced by the traverses.

A design concerning the second seat provides that the second seat is implemented cone shaped, and that the second seal axially/radially seals with a slide/pressure engagement with respect to the second seat, wherein the stop surface according to the invention firmly contacts the second seat. According to a further embodiment it is proposed that the second seat is arranged perpendicular to the longitudinal axis of the double seat valve, and the second seal axially seals with pressure engagement with respect to the second seat, where here, too, the stop surface according to the invention firmly contacts the second seat. Such solutions with the advantages of an axially/radially acting seal, and an axially/radially acting seat disk, or with the advantages of a purely axially acting seal and a purely axially acting seat disk are only possible if, on the one hand, the second seal has such ductile properties, and on the other hand, can undergo in the context of its insertion a volume constant form change in such a way that firm abutment, provided according to the invention, of the second sealing element with its stop surface against the second seat is assured under all conditions. Here the firm abutment is usually in each case implemented as a metallic abutment.

In the first embodiment, described in the preceding, of the double seat valve according to the invention the quantity of the cleaning agent is limited during the seat cleaning by the adjustment of the gap between the seat seal and the respective associated seat.

The present invention proposes in the context of a second embodiment to limit the quantity of cleaning agent during the seat cleaning by known choke gaps. For this it is proposed that on the first closing element on the side of the leakage cavity, a cylindrical appendage is provided which together with the first seat forms an annular first choke gap. The second closing element has, with respect to its second seal, a cylindrical circumferential contour on its radial outside, where the circumferential contour forms, together with an annular cylindrical recess in the connecting opening on the side of the second closing element, an annular second choke gap.

BRIEF DESCRIPTION OF THE SEVERAL VIEWS OF THE DRAWINGS

Exemplary embodiments of the proposed double seat valve with seat cleaning according to the invention are illustrated in the drawings and are described below according to construction and function. They show:

FIG. 3 in a longitudinal and detail section, an enlarged representation of the seat FIG. 4 in schematic and enlarged representation, a contour of the seat area for the first closing element and the adjacent second seat for a double seat valve according to FIGS. 1 to 2a;

FIG. 5a in perspective representation, a one-piece welded part, consisting of three traverses that each fixedly connect a section of a displacement rod to a ring, for the connection of the first valve rod with a pressure compensation piston arranged at the end, distant from the leakage cavity, of the first closing element, and FIG. 5b in meridian section, the integrated construction of a first closing element and the immediately adjacent pressure compensation piston, welded part, and first valve rod.

DETAILED DESCRIPTION OF THE INVENTION

Figure 1:
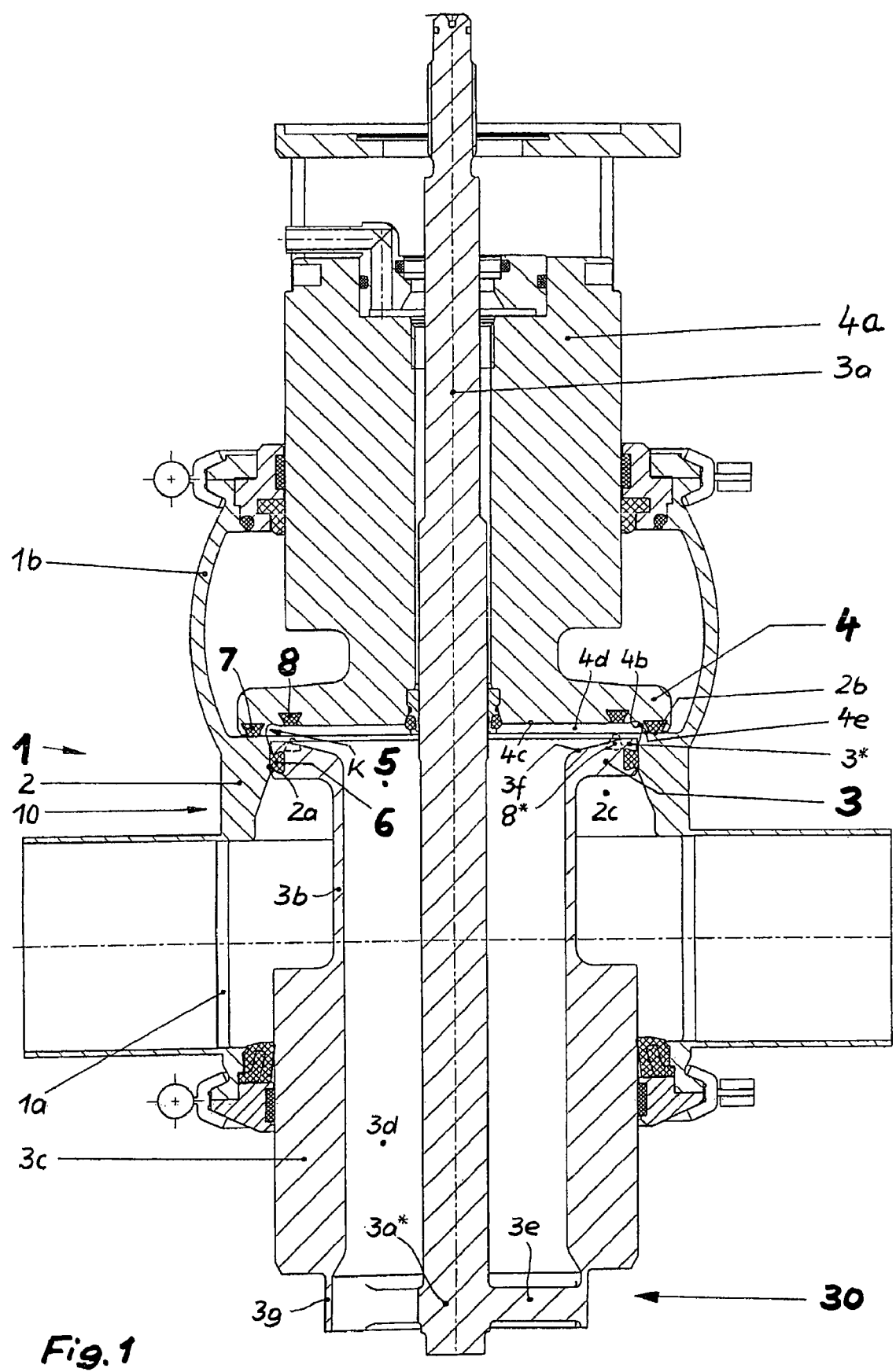
FIG. 1 in longitudinal and meridian section, the double seat valve with seat cleaning according to the invention in a first embodiment where the double seat valve is in its closed position, and a center seal is arranged in the second closing element.

While this invention may be embodied in many different forms, there are described in detail herein a specific preferred embodiment of the invention. This description is an exemplification of the principles of the invention and is not intended to limit the invention to the particular embodiment illustrated.

A double seat valve 1 according to the invention (FIGS. 1 and 1a) consists in a first embodiment essentially of a valve housing 10 with a first and a second valve housing part 1a and 1b, two closing elements 3 and 4 that can be moved independently of each other, each with an associated displacement rod 3a and 4a, and a seat ring 2 that creates a connection between the two valve housing parts 1a and 1b through an inside connecting opening 2c.

The first closing element 3 (active closing element) that is designed as a slide piston, is received in a sealing manner in the closed position of the double seat valve 1 (FIG. 1) in a first seat 2a, formed by the connecting opening 2c, that is implemented as a cylindrical seat. For this purpose a first seal 6 is provided in the slide piston 3, which interacts with the first seat 2a exclusively through radial pretension (radial seal with slide engagement). The second closing element 4, formed as a seat disk, interacts in the closed position of the double seat valve 1 with a second seat 2b, that is implemented perpendicularly to the longitudinal axis of the double seat valve 1 at the upper side of the seat ring 2. The sealing occurs via a second seal 7 that seals axially against the second seat 2b (seal in pressure engagement).

The two closing elements 3, 4 form between them, in the represented closed position as well as in an open position (FIG. 1a), a leakage cavity 5 that is connected to the surroundings of the double seat valve 1 through a drainage hole 3d that penetrates concentrically each a connecting part 3b connected to the first closing element 3, and a pressure compensation piston 3c that continues at the connecting part.

Usually the first displacement rod 3a is fixedly connected in the area of the first closing element 3 with the latter by several webs that penetrate the drainage hole 3d star shaped and in radial direction. As these webs can have negative impact on the flow conditions and the flow pattern in the leakage cavity 5, it is provided with the double seat valve 1 according to the invention, to relocate these mechanically necessary connection points in the form of three traverses 3e, uniformly distributed over the circumference, by a distance away from the leakage cavity 5, preferably to the end of the pressure compensation piston 3c that is facing away from the first closing element 3. The fixed connection with the latter occurs via a circumferential ring 3g to which the traverses 3e are fixedly connected radially at the outside. Expediently, the traverses 3e, the ring 3g, and a displacement rod section 3a\* are integrated in an integral welded part 30.

In the front side of the second closing element 4 facing the leakage cavity 5, a centered recess 4d is provided (FIGS. 1, 1a, and 3) which begins radially on the outside with a rotationally symmetric deflection surface 4b, and there forms a second circumferential edge U2 (FIG. 3), and which is bounded on its front side by a front face 4c that is oriented essentially perpendicular to the longitudinal axis of the double seat valve 1, where the deflection surface 4b opens into the front face 4c with a deflection angle β. A center seal 8, which is arranged in the front face 4c, radially inside of the recess 4d, seals the closing elements 3, 4 against each other during the open and closing movement and in the open position (FIG. 1a).

The second circumferential edge U2 borders in the closed position of the second closing element 4 (FIGS. 3, 1a) immediately on a first end section 2g of the first seat 2a. Viewed in the meridian section, the deflection surface 4b has a contour K with an unbent shape, where a first section K1 of the contour K, bordering the first end section 2g, continues through further sections K2, K3, until Kn (FIG. 3), and the directional vector at the end point of the last section, K5 or Kn, points into the drainage hole 3d that is arranged centered in the first closing element 3, without colliding with the first closing element 3 in the region of its areas bordering the leakage cavity 5 or of the center seal 8, forming a dynamic pressure.

So that a first seat cleaning flow R1, which after a first partial lift T1, directed downward relative to the representation position, of the first closing element 3 is guided through the gap between the first seal 6 and the first seat 2a, can be guided tangentially past the center seal 8 (FIG. 3), the deflection surface 4b undercuts the front face 4c by an axial undercutting distance y. A front side border of the first closing element 3 facing the leakage cavity 5 has an axial safety distance x from the directional vector at the outlet point of the second seat 2b into the first end section 2g, where the outlet point is designed in the form of a first circumferential edge U1.

In the open position of the double seat valve (FIG. 1a), when a complete opening lift H is realized, it becomes clear that the center seal 8 that is arranged in the recess 4d assures a secure sealing of the two closing elements 3, 4 between, on the one hand, the valve housing parts 1a, 1b that are connected to each other through the connecting opening 2c, and the leakage cavity 5 on the other hand.

Figure 3:
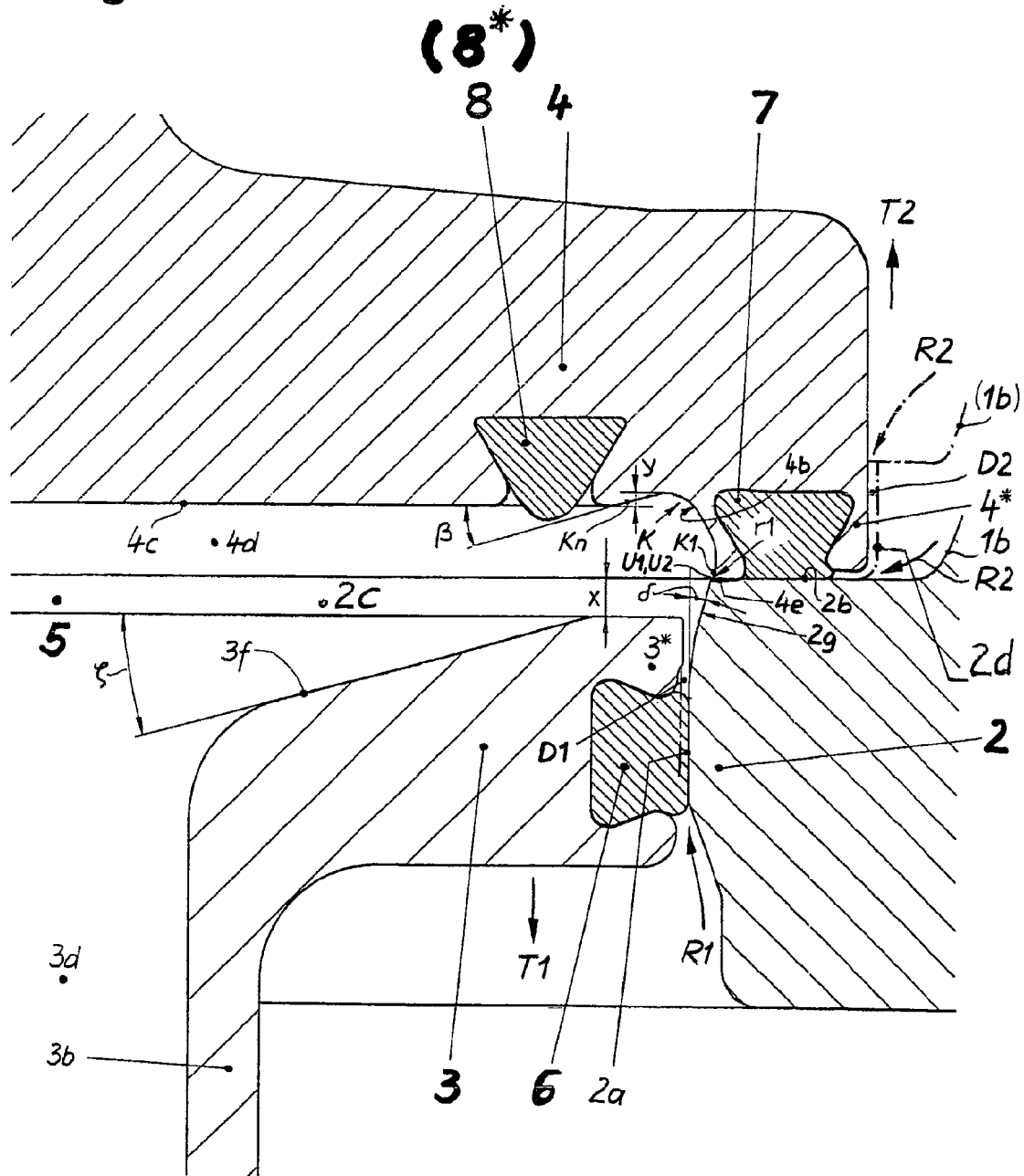

FIG. 3 further clarifies that the first section K1 aligns with the first end section 2g. Here, the first end section 2g can be formed as a conical section (first opening slope) with exclusively curved, or with curved and straight contour elements, which connects to the seat 2a with a rounding radius r2 (see also FIGS. 4 and 1a), and opens towards the second closing element 4. The first end section 2g is inclined with respect to the first seat 2a with a pitch δ. The pitch δ is implemented in the range of 0 to 15 degrees, preferably in the range of 5 to 15 degrees, and here in turn preferably with δ=15 degrees.

Figure 4:
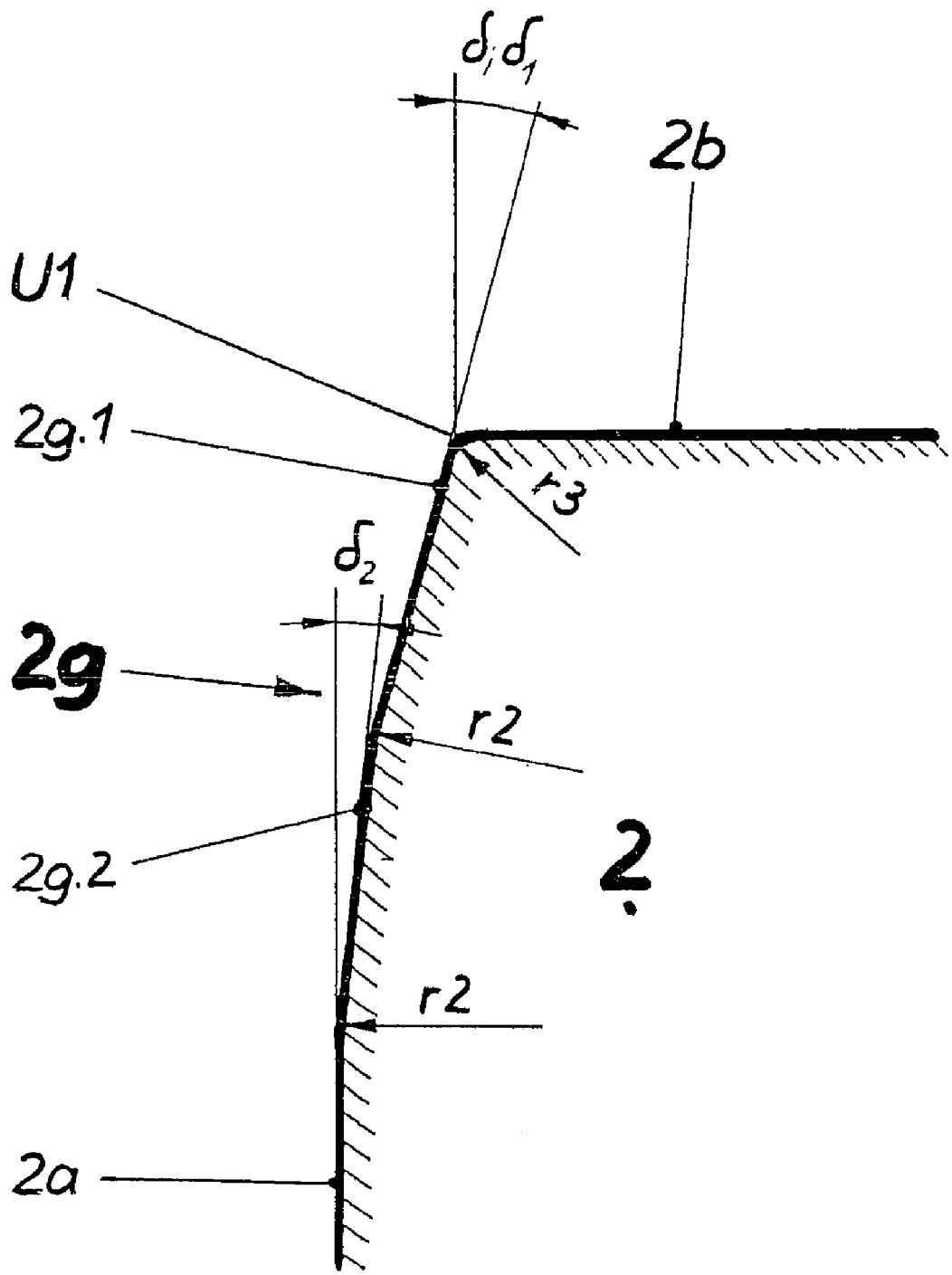

A further optimization of the first end section 2g in the form of a further improved opening slope is, according to FIG. 4, distinguished by the fact that the first end section 2g is formed by two cone shaped surfaces that transition, in a rounded manner, into each other with the rounding radius r2, where a second cone shaped surface 2g.2 adjoining immediately at the first seat 2a is inclined by a second pitch $\delta_2$ with respect to the first seat 2a, and the other cone shaped surface 2g.1 is inclined by a first pitch $\delta_1$ with respect to the first seat 2a. Here, the first pitch $\delta_1$ is implemented in the range of 7.5 to 15 degrees, preferably $\delta_1$=15 degrees and the second pitch $\delta_2$ is implemented in the range of 5 to 10 degrees, preferably with $\delta_2$=7.5 degrees. It is further shown in the FIGS. 4 and 1 that the front face of the first closing element 3 is provided in the direction towards the drainage hole 3d with a sloping conical chamfer 3f, where the latter is preferably implemented as a cone shaped surface, and is inclined by an inclination angle of ζ0 with respect to the base of the cone. This inclination angle ζ is implemented preferably in the range of 10 to 20 degrees, and here in turn preferably with ζ=15 degrees.

The first seat cleaning flow R1 that, after the completion of the first partial lift T1, in the course of the seat cleaning of the first closing element 3, emerges from the gap between the first seal 6 and the first seat 2a (FIG. 3), first flows vertically along the first seat 2a, follows, without detaching, the shape of the first end section 2g, formed as the first opening slope or, respectively, the cone shaped surfaces 2g.2, 2g.1 (FIG. 4), and enters without impact into the deflection surface 4b in the recess 4d, is deflected there according to the contour K, leaves the fifth and last section K5 (K5=Kn) with the deflection angle β, is tangential to the center seal 8, aligns itself essentially tangentially with the front face 4c, and finally reaches the area of the drainage hole 3d. It becomes clear that the first section K1 is aligned with the first end section 2g. To prevent the first seat cleaning flow R1 from forming a dynamic pressure at the second circumferential edge U2, the latter borders in the closed position of the second closing element 4 immediately on the first end section 2g, and is rounded with a smallest possible edge rounding r1.

A further implementation of the deflection surface 4b provides that the contour K consists of a sequence of curved sections K1 to Kn (e.g., circular arcs, ellipses, parabolas, hyperbolas), which at each of their respective transition points have a common tangent. According to a further embodiment the contour K is formed from a single section with continuously changing curvature (e.g., spiral or other curved shape that can be described mathematically in closed form). The contour K, according to a further proposal, is implemented with a single section with constant curvature (e.g. a single circular arc with the necessary tangential entry and exit).

With the double seat valve 1 according to the invention, in the first embodiment, the second seat 2b is arranged perpendicularly to the longitudinal axis of the double seat valve (FIGS. 1 and 1a, 3), where the second seal 7, arranged in the second closing element 4, seals axially against this second seat 2b with pressure engagement. This solution is then possible, when the axially acting second seal 7 is ductile, and a constant volume form change is possible in such a way that the fixed stop position of the second closing element 4 is guaranteed by a stop surface 4e on the side of the closing element in the area of the second seat 2b that is emerging into the first seat 2a. The front face of the second closing element 4 that is bordering the second seal 7 radially on the outside recedes by a certain distance in axial direction to guarantee the previously described defined fixed stop position by the stop surface 4e (FIG. 3).

The second seat 2b can also be implemented cone shaped, where the second seal 7 seals axially/radially against the second seat 2b in slide/pressure engagement.

Figure 1A:
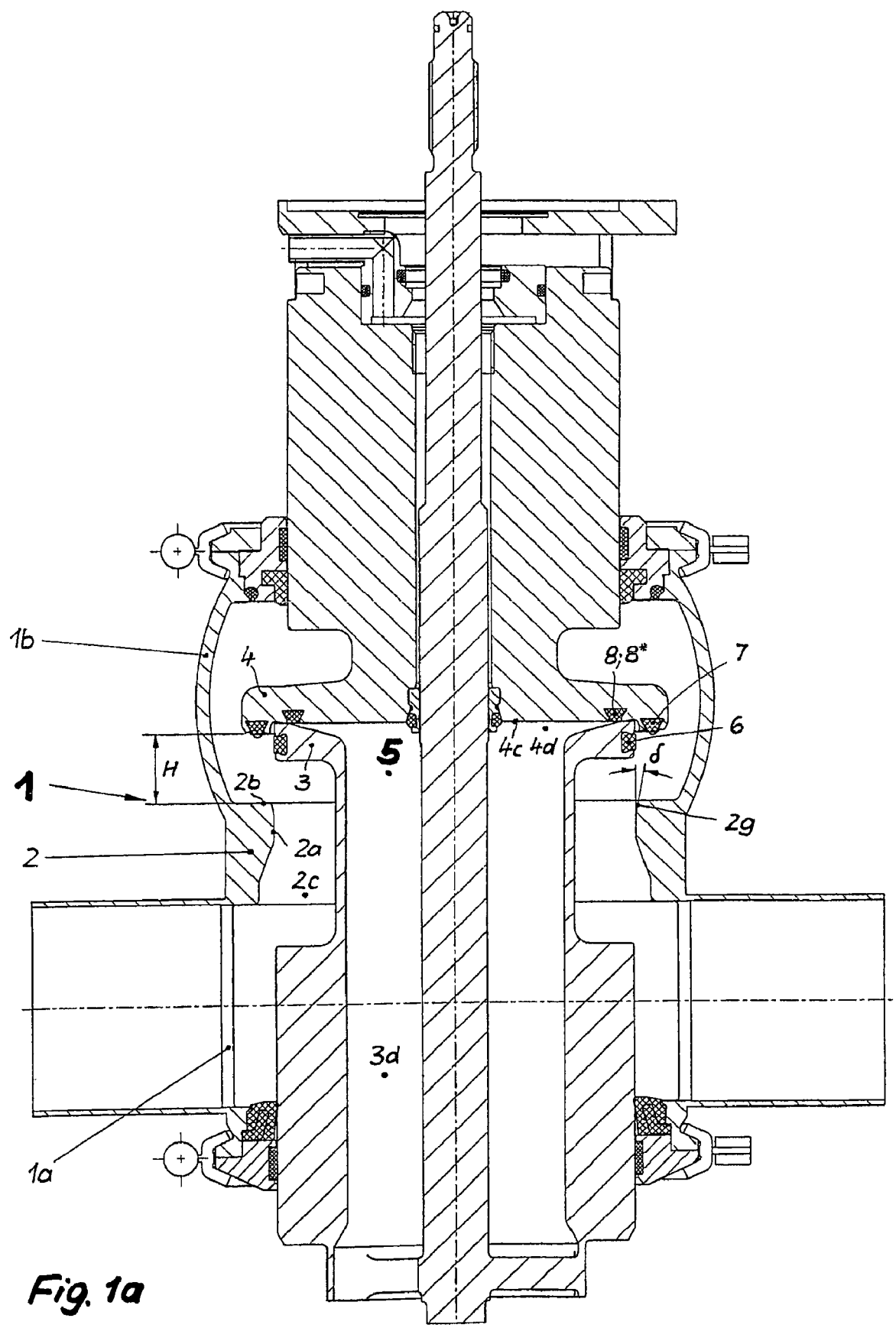
FIG. 1a in a longitudinal and meridian section, the double seat valve according to FIG. 1, where the valve is in its open position.

It can be seen from FIG. 1 that the double seat valve 1 with seat cleaning according to the invention in a modified embodiment, in which an alternative center seal 8* is arranged in the first closing element 3 (represented dashed), has without limitation all features essential to the invention that have been described in the context of the first embodiment. In this case, the alternative center seal 8* corresponds to and acts together with the front face 4c of the recess 4d in the second closing element 4.

The seat cleaning of the second closing element 4 occurs (FIG. 3) in that the latter is lifted gap-wide by a second partial lift T2 from its associated second seat 2b, and cleaning agent in the form of a second seat cleaning flow R2 is guided from the adjacent first valve housing part 1b over the exposed second seat 2b into the leakage cavity 5. In order to assure that the second seat cleaning flow R2 is not prematurely deflected into the direction of the first closing element 3, the first circumferential edge U1 that is formed by the second seat 2b and the first end section 2g, is rounded with a smallest possible second corner rounding r3 (FIG. 4), whereby a defined flow detachment point develops at this point. This measure guarantees that the second seat cleaning flow R2 is not directed onto the seat area of the first seal 6.

During the seat cleaning of the second closing element 4, the first closing element 3 is axially positioned such that the second seat cleaning flow R2 can flow unimpeded across the first closing element 3. Depending on the prevailing pressure conditions and under the influence of gravity with the arrangement of the double seat valve 1 according to the position in the drawing, the fluid flow takes on a slightly parabolic shape, such that the flow passes tangentially over the front face of the first closing element 3 with its chamfer 3f, which is desirable for cleaning technical reasons. Through this flow guidance, and the positioning of the first closing element 3, even a suctioning of the seat area of the first seal 6 is attained, so that even with a loss or a significant damage of the first seal 6, no cleaning agent R2 can enter into the adjacent first valve housing part 1a.

The end of the gap between the second closing element 4 and the associated second seat 2b, on the side of the leakage cavity, is tightly closed as far as possible by the previously described fixed stop position of the second closing element 4 with its stop surface 4e at the second seat 2b (to the degree to which this is principally possible with an abutment rigid against rigid, preferably metal against metal). Cleaning agent of the first seat cleaning flow R1 can no longer enter into the gap between the second closing element 4 and the associated second seat 2b, and therefore into the area of the second seal 7. Therefore, even with a possibly strongly damaged or possibly entirely removed second seal 7, no passage is possible for cleaning flow R1.

Figure 2:
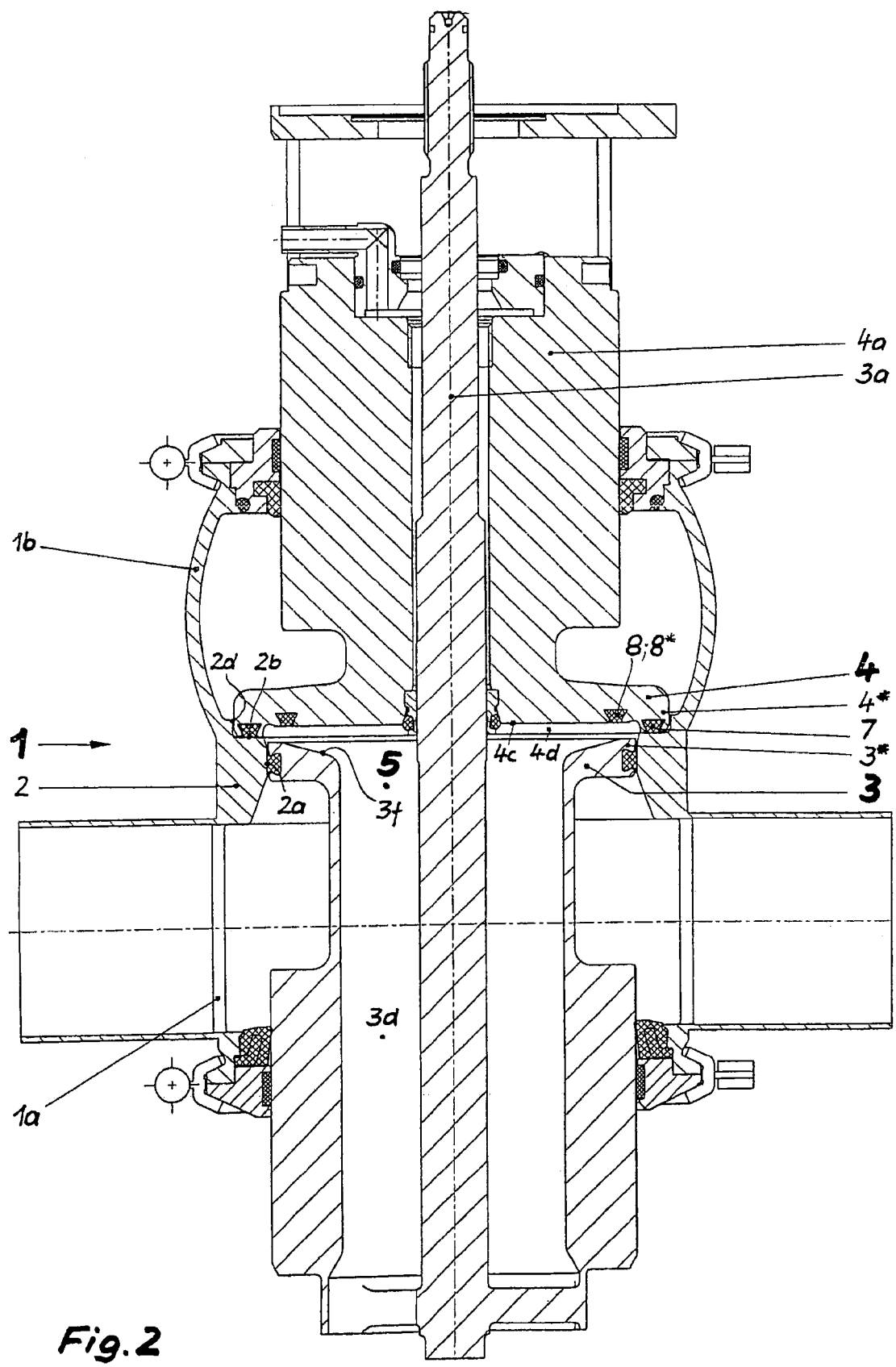
FIG. 2 in a longitudinal and meridian section, the double seat valve according to the invention in a second embodiment, where the double seat valve is in its closed position, and now a limitation of the quantity of cleaning agent is provided in both seat cleaning positions, in each case with a choke gap.
Figure 2A:
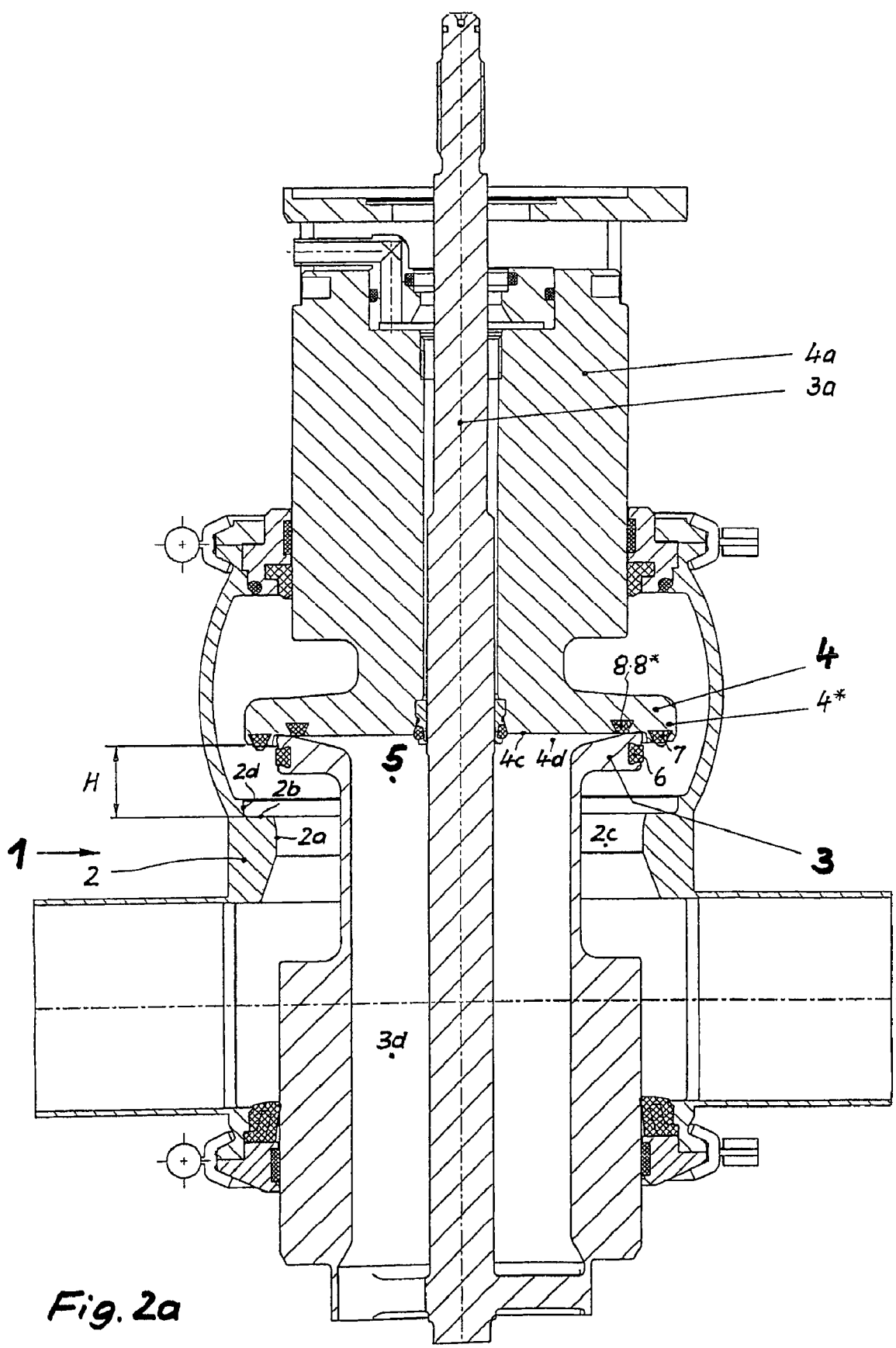
FIG. 2a in a longitudinal and meridian section, the double seat valve according to FIG. 2 in its open position.

FIG. 2 (closed position) and FIG. 2a (open position) show a second embodiment of the double seat valve 1 according to the invention. The first closing element 3 has on its side facing the leakage cavity a cylindrical first appendage 3*, which, together with the associated part of the periphery of the connecting opening 2c in the seat ring 2, forms an annular first choke gap D1 (see also FIG. 3). This first choke gap D1 becomes effective when the first closing element 3 is slid by the first partial lift T1 so far downward within the cylindrical first seat 2a, that the first seal 6 comes clear of the latter, and the first seat cleaning flow R1 is guided from the first valve housing part 1a, and into the leakage cavity 5.

The second closing element 4 has radially on the outside, relative to its second seal 7, a cylindrical peripheral contour 4* formed by a cylindrical outer shape of the second closing element 4, which, together with an annular cylindrical recess 2d in the connecting opening 2c on the side of the second closing element 4, forms an annular second choke gap D2 (FIG. 3). This second choke gap D2 becomes effective when the second closing element 4 is lifted by the second partial lift T2 from the second seat 2b, so that the second seat cleaning flow R2 is guided from the second valve housing part 1b and led into the leakage cavity 5.

FIG. 5a represents the integral welded part 30 that is formed by the displacement rod section 3a*, the three traverses 3e, and the ring 3g. The three traverses 3e that are uniformly distributed over the circumference of the displacement rod section 3a* are fixedly connected to the latter. They are also each radially on the outside fixedly connected to the circumferential ring 3g. The welded part 30 is welded on the outside via the ring 3g to the pressure compensation piston 3c bounding the section of the drainage hole 3d that is distant from the leakage cavity (see FIG. 5b), and on the inside is welded via the displacement rod section 3 a* to the first displacement rod 3 a. Here, the ring 3g is enlarged in its interior diameter compared to the diameter of the drainage hole 3d, interposing a conically expanding transition region, such that the inner passage of the drainage hole 3d is not reduced by the traverses 3e.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A double seat valve with seat cleaning, with a first and a second closing elements (3, 4) arranged in a series, and which can be moved relative to one other, and that in the closed position of the double seat valve (1) prevent the overflow of fluids from one valve housing part (1a; 1b) into another housing part (1b; 1a), that in the closed position as well in the open position define a leakage cavity (5) that is connected to surroundings of the double seat valve (1), wherein a cylindrical first seat (2a) is associated with the first closing element (3) and a second seat (2b) is associated with the second closing element (4) wherein the first and second seat (2a, 2b) are coaxial, wherein in the closed position the first closing element (3), formed as a slide piston, is received in a sealing manner in a connecting opening (2c) that connects the valve housing parts (1a, 1b) with each other, and in the course of its opening movement comes into sealing abutment, through a center seal (8; 8*) acting between the first and second closing elements (3, 4), wherein the second closing element (4) has a second seal (7), and in a further opening movement the second closing element (4) is also transferred into an open position (H), wherein the first closing element (3) has a first seal (6) that radially seals against the cylindrical first seat (2a) formed in the connecting opening (2c), with closing elements (3, 4) that can independently of each other be transferred gap wide by a partial lift, into a seat cleaning position for the purpose of rinsing their coaxial seats (2a, 2b), wherein the second closing element (4) can be transferred through a second partial lift (T2) in the same direction as the opening movement, and the first closing element (3) through a first partial lift (T1) in the direction opposed to the opening movement, each into their respective seat cleaning position, wherein the second closing element (4) in its closed position abuts with a stop surface (4e) which is arranged at its periphery that is adjacent radially on the inside of the second seal (7), to the second seat (2b), specifically immediately bordering on the first seat (2a, 2g), wherein in the front face of the second closing element (4), facing the leakage cavity (5), a centered recess (4d) is provided which begins radially on the outside with a rotationally symmetric deflection surface (4b), and on its front side is bounded by a front face (4c) that is oriented perpendicular to the longitudinal axis of the second closing element (4), wherein the deflection surface (4b) opens into the front face (4c), wherein the deflection surface (4b) and the stop surface (4e) form a second circumferential edge (U2) which in the closed position of the second closing element (4) borders directly on a first end section (2g) of the first seat (2a), wherein, viewed in a meridian section, the deflection surface (4b) has a contour (K) with an unbent shape, and a directional vector at the opening point of the deflection surface (4b) points into a drainage hole (3d) that is centrally arranged in the first closing element (3), without colliding with the first closing element (3) in the region of its areas bounding the leakage cavity (5) or with the center seal (8;8*), creating a dynamic pressure, and wherein a front side boundary of the first closing element (3), facing the leakage cavity (5), has an axial safety distance (x) from the directional vector at an outlet point of the second seat (2b), formed as a first circumferential edge (U1), into the first end section (2g).

2. The double seat valve according to claim 1, wherein the center seal (8) is arranged in the front face (4c).

3. The double seat valve according to claim 1, wherein the safety distance (x) is at least as large as the sum of all manufacturing tolerances of the components of the double seat valve (1) that in the closed position of the first closing element (3) determine its smallest axial distance to the second seat (2b).

4. The double seat valve according to claim 1, wherein an alternative center seal (8*) is arranged in the front side boundary of the first closing element (3), facing the leakage cavity (5), and interacts with the front face (4c).

5. The double seat valve according to claim 4, wherein the safety distance (x) is at least as large as the sum of all manufacturing tolerances of the components of the double seat valve (1) that in the closed position of the first closing element (3) determine its smallest axial distance to the second seat (2b), adding the axial distance by which the alternative center seal (8*) protrudes from the face side boundary of the closing element (3), facing the leakage cavity (5).

6. The double seat valve according to the claim 1, wherein a directional vector at the starting point of the contour (K) aligns with the first end section (2g).

7. The double seat valve according to claim 1, wherein the first end section (2g) is formed as a conical end section, which connects with a rounding radius (r2) to the seat (2a), and opens towards the second closing element (4).

8. The double seat valve according to claim 7, wherein the first opening slope (2g) is formed by at least one cone shaped surface.

9. The double seat valve according to claim 8, wherein the first opening slope (2g) is inclined by a pitch (δ) with respect to the first seat (2a).

10. The double seat valve according to claim 9, wherein the pitch (δ) is implemented in the range of $0 \leq \delta \leq 15$ degrees.

11. The double seat valve according to claim 8, wherein the first end section (2g) is formed by two cone shaped surfaces that transition into each other rounded with a rounding radius (r2), wherein a second cone shaped surface (2g.2) adjoining immediately to the first seat (2a) is inclined by a second pitch (δ2) with respect to the first seat 2a, and the other cone shaped surface (2g.1) by a first pitch (δ1) with respect to the first seat (2a), and where the first pitch (δ1) is implemented in the range of $7.5 \leq \delta 1 \leq 15$ degrees, and the second pitch (δ2) in the range of $5 \leq \delta 2 \leq 10$ degrees.

12. The double seat valve according to claim 1, wherein the first circumferential edge (U1) formed by the second seat (2b) and the first end section (2g) is rounded with a smallest possible second edge rounding (r3).

13. The double seat valve according to claim 1, wherein the second circumferential edge (U1) is rounded with a smallest possible first edge rounding (r1).

14. The double seat valve according to claim 1, wherein the deflection surface (4b) undercuts the front face (4c) with an axial undercut distance (y).

15. The double seat valve according to claim 1, wherein
the contour (K) consists of a sequence of curved sections (K1, K2, K3, ..., Kn) that at their respective transition points have in each case a common tangent,
or that the contour (K) consists of a single section with continuously changing curvatures
or that the contour (K) consists of a single section with constant curvature.

16. The double seat valve according to claim 15,
wherein the directional vector of the last curved section (Kn) in a sequence of curved sections $(K_1, K_2, K_3 \ldots K_n)$ has a deflection angle (β) with respect to the front face (4c), in the range of $5 \leq \beta \leq 20$ degrees.

17. The double seat valve according to claim 1,
wherein the drainage hole (3d) connects the leakage cavity (5) with the surroundings of the double seat valve (1), and that the face side boundary of the first closing element (3), facing the leakage cavity (5), has a chamfer (3f) that is sloping on all sides circumferentially towards the drainage hole (3d).

18. The double seat valve according to claim 17, wherein the chamfer (3f) is implemented as a cone shaped surface.

19. The double seat valve according to claim 18, wherein the cone shaped surface is inclined with respect to the base of the cone by an inclination angle (ζ), in the range of $10 \leq \zeta \leq 20$ degrees.

20. The double seat valve according to claim 1,
wherein a first displacement rod (3a), connected to the first closing element (3), concentrically penetrates a second displacement rod (4a), connected to the second closing element (4) and implemented as a hollow rod, continues flying through the drainage hole (3d), and is rigidly connected to the first closing element (3) at the latter's end facing away from the second closing element (4), via a radially oriented traverse (3e).

21. The double seat valve according to claim 20,
wherein at a displacement rod section (3a*), three traverses (3e) are fixedly provided that are uniformly distributed over the circumference and that each is radially on its outside fixedly connected to a circumferential ring (3g), and that the displacement rod section (3a*), the traverses (3e), and the ring (3g) form one-piece welded part (30).

22. The double seat valve according to claim 21,
wherein the welded part (30) connects on its outside via the ring (3g) to a pressure compensation piston (3c) that is bounding a section of the drainage hole (3d) that is remote from the leakage cavity, and on its inside connects via the displacement rod section (3a*) to the first displacement rod (3a), and that the ring (3g) in its interior diameter is enlarged with respect to the diameter of the drainage hole (3d), interposing a conically expanding transition area, such that the interior passage through the drainage hole (3d) is not reduced by the traverses (3e).

23. The double seat valve according to claim 1, wherein the second seat (2*b*) is implemented with a conical shape, and that the second seal (7) seals axially/radially against the second seat (2*b*) in sliding/pressing engagement.

24. The double seat valve according to claim 1, wherein the second seat (2*b*) is arranged perpendicular to the longitudinal axis of the double seat valve (1), and that the second seal (7) seals against the second seat (2*b*) in pressing engagement.

25. The double seat valve according to claim 1, wherein at the first closing element (3) on the side of the leakage cavity a cylindrical appendage (3*) is provided that forms together with the first seat (2*a*) an annular first choke gap (D1).

26. The double seat valve according to claim 1, wherein the second closing element (4), relative to its second seal (7), has radially on the outside a cylindrical circumferential contour (4*), and that the circumferential contour (4*) together with an annular cylindrical recess (2*d*) in the connecting opening (2*c*) on the side of the second closing element (4) forms an annular second choke gap (D2).

27. The double seal valve according to claim 10 wherein the pitch δ is in the range of 5≦δ≦15 degrees.

28. The double seal valve according to claim 27 wherein the pitch δ is 15 degrees.

29. The double seal valve according to claim 11 wherein the first pitch δ1 is 15 degrees and the second pitch δ2 is 7.5 degrees.

30. The double seat according to claim 16 wherein the deflection angle (β) is 15 degrees.

31. The double seat according to claim 19 wherein the inclination angle (ζ) is 15 degrees.

* * * * *